April 30, 1935.  L. E. LA BOMBARD  1,999,878
COLLAPSIBLE HANDLE FOR CUPS AND THE LIKE
Filed April 5, 1934   2 Sheets-Sheet 1
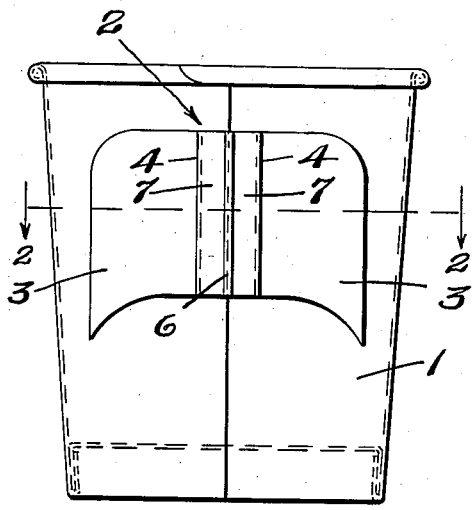
Fig-1-
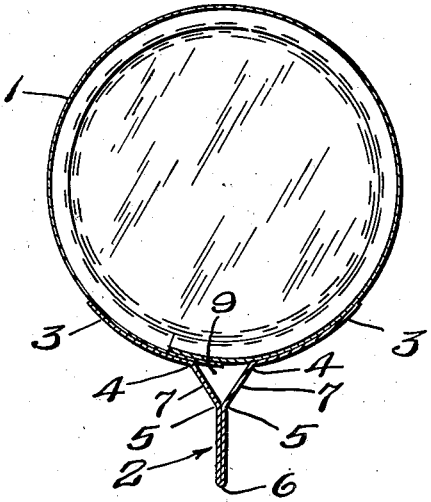
Fig-2-
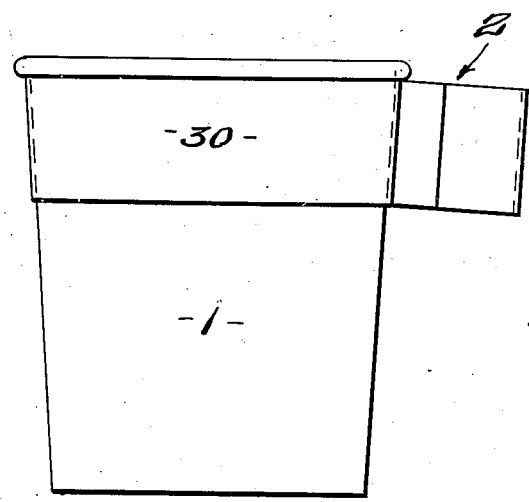
Fig-4-
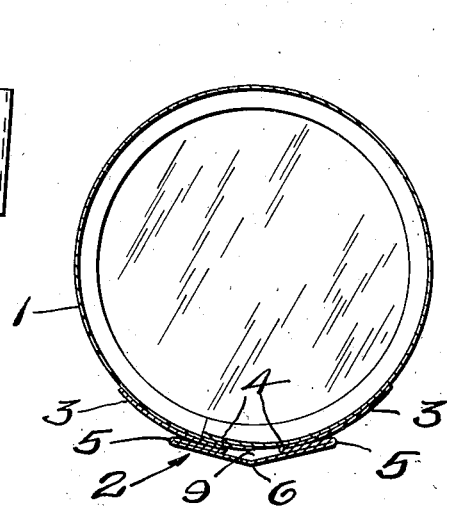
Fig-3-
INVENTOR.
Leon E. La Bombard
BY
Bodell & Thompson
ATTORNEYS.

April 30, 1935.  L. E. LA BOMBARD  1,999,878
COLLAPSIBLE HANDLE FOR CUPS AND THE LIKE
Filed April 5, 1934   2 Sheets-Sheet 2
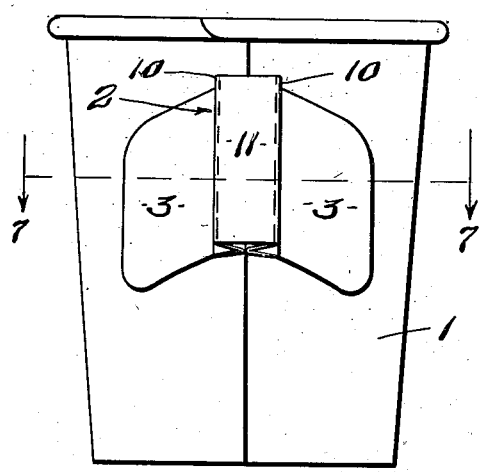
Fig-5-
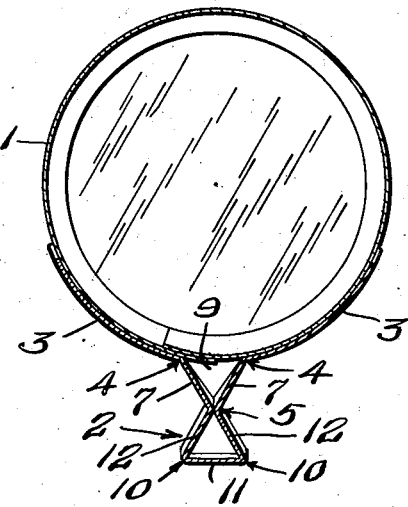
Fig-7-
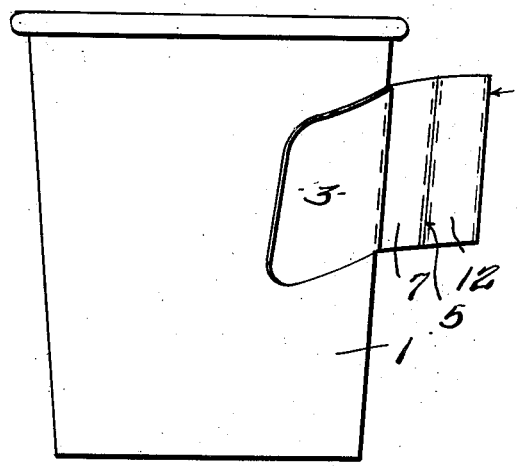
Fig-6-
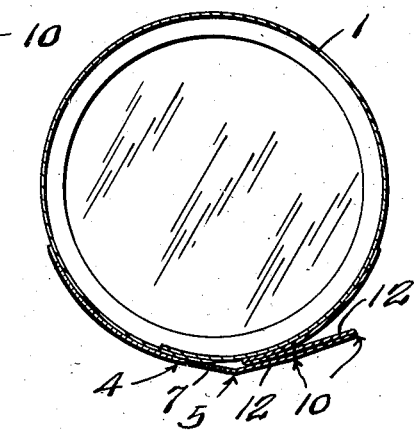
Fig-8-
INVENTOR.
Leon E. La Bombard
BY Bodell & Thompson
ATTORNEYS.

Patented Apr. 30, 1935

1,999,878

UNITED STATES PATENT OFFICE 1,999,878

COLLAPSIBLE HANDLE FOR CUPS AND THE LIKE

Leon E. La Bombard, Fulton, N. Y., assignor to Oswego Falls Corporation, Fulton, N. Y., a corporation of New York Application April 5, 1934, Serial No. 719,156

7 Claims. (Cl. 229—52)

This invention relates to handles for cups of paper, and similar material, and has for its object a handle by which the cups can be easily handled, and also a handle which can be readily collapsed to lie flatwise against the cup to permit the cups to be nested one within the other.

It also has for its object, a handle which is in the form of a loop provided with folding lines by which it collapses flatwise against the cup, and also expands into a radial position relative to the cup, and further an arrangement of the loop by which the sides of the loop, where the loop is attached to the cup, are spaced apart in a direction circumferentially of the cup, so that when the handle is expanded from its collapsed form and pinched together by the hand, the portion of the sides of the loop approaching the points of securement to the cup diverge toward the cup forming braces giving substantial feel, or thickness, to the handle and effecting a rigid support for the cup, without touching the cup with the fingers, whereby the cup may be manipulated in the same manner as a cup provided with an integral or rigid handle.

The invention has for a further object, the provision of means for heat-insulating the handle from the cup whereby the cup may be used for hot liquids.

The invention consists in the novel features and in the combinations and constructions hereinafter set forth and claimed.

In describing this invention, reference is had to the accompanying drawings in which like characters designate corresponding parts in all the views.

Figure 1 is a side elevation of a cup provided with one form of my handle.

Figure 2 is a sectional view on line 2—2, Figure 1.

Figure 3 is a view, similar to Figure 2, showing the handle in collapsed form.

Figure 4 is an elevation of a cup provided with a slightly modified form of the handle.

Figures 5, 6, 7 and 8, are views, corresponding to Figures 1, 4, 2 and 3 respectively, of a cup provided with another form of my handle.

I designates the cup which is usually formed of fibrous material, such as paper, the cup being of any suitable construction. The construction of the cup per se, forms no part of this invention. As here shown, the cup is of the tapered, or nested, type permitting the insertion of one cup within another to occupy the minimum space for shipment.

2 designates generally the handle which is preferably formed from a strip, or band, or paper, or fibrous material. The end portions of the band, as here shown, serve as base flanges 3 which overlie the periphery of the cup, and which are secured thereto in any suitable manner, as by an adhesive. The base flanges 3 are preferable secured to the side wall of the cup in spaced-apart relationship circumferentially of the cup, for reasons hereinafter referred to. The band is scored, or formed with transverse folding lines 4 where the sides of the loop portion join the flanges 3. Also, the loop is formed with transverse folding lines, as scores, which permit the loop to fold flat, or bellows fashion, into the position shown in Figure 3 of the drawings, whereby the handle, even though permanently secured to the cup, does not interfere with the nesting of one cup within the other.

As here illustrated, Figures 1 to 4, the loop is formed with folding lines at 5 intermediate of its base and apex, and also with a folding line at 6 at its apex. Owing to the fact that the ends of the loop at 4 are spaced apart in a direction circumferentially of the cup, an appreciable thickness and bracing effect is given to the handle when expanded and pinched together, as shown in Figure 2, thus making this flexible handle substantial and rigid, when the loop is grasped between the fingers.

In the form shown in Figures 1, 2 and 3, the base flanges 3 are arcuate and extend but part way around the cup.

In the form shown in Figure 4, the base flanges 30 constitute a ring extending entirely around the cup. While the collapsed handle is here shown as secured to a tapered or nesting cup, it is equally applicable to cylindrical or straight wall cups, as will be obvious.

In the form shown in Figures 5 to 8, the loop is provided with spaced-apart folding lines 10, rather than the single folding lines 6, as in Figures 1 to 4. In Figures 5 to 8, the flat portion 11 forms the outer end of the loop. This form of handle when expanded, Figure 7, provides an enlarged outer portion which permits the handle to be grasped more easily. That is, the side portions or braces 7, and the side portions 12, extend at an angle to the axis of the handle, resulting in the sides of the handle being concave, or reduced in thickness, at the center. This form of handle collapses and folds circumferentially against the side wall of the cup, as illustrated in Figure 8.

In any form of the invention, the ends of the loop at 4 are preferably spaced apart to provide diverging walls 7 which give a substantial thickness and rigidity to the handle, when the handle is in expanded position.

When this handle in expanded form (Figures 2–7) is grasped between the fingers, the diverging walls 7, in addition to acting as a stiffening brace between the cup and the handle, also provide a means for insulating the handle from the cup, and also serve as a convenient means of spacing the finger tips away from the edge of the cup. Due to the fact that the diverging walls 7, and the grip portion of the handle, are spaced away from the side wall of the cup, the cup may be used for hot drinks without any discomfort to the user.

The space 9, defined by the side wall of the cup and the diverging sides 7, provides a space for the circulation of air whereby perfect insulation of the handle is effected. Where the cups are not intended to be used for hot drinks, the base flanges 3 may be secured to the cup with their inner ends adjacent each other, in which case, the cup is steadied by pressure of the finger tips against the side walls of the cup. However, I prefer to space the flanges 3 circumferentially of the cup, for the reasons above set forth.

The handles are struck from blanks, and may be struck and folded in one operation from blanks which are looped, and during the blanking-out operation, the loop is flattened at the same time providing the folding lines 4, 5 and 6, or 4, 5 and 10. However, the method of forming the handles from the blanks forms no part of this invention.

What I claim is:

1. The combination with a cup of fibrous material; of a handle therefor of similar material comprising a loop having the ends thereof secured to the cup and foldable from a collapsed position in which it extends in a circumferential direction around the cup into a position radial with the cup.

2. The combination with a cup of fibrous material; of a handle therefor of similar material comprising a loop secured at its ends to the cup and having its side walls provided with fold lines to permit the loop to fold from a collapsed position flatwise against the cup into a position radial with the cup.

3. The combination with a cup of fibrous material; of a handle therefor of similar material comprising a loop secured at its ends to the cup, said ends being spaced apart from each other in a direction circumferentially of the cup, the sides of the loop being provided with transverse folding lines for causing the loop to collapse bellows-fashion into a position wherein it lies flatwise on the cup and to expand into an extended position radially to the cup.

4. The combination with a cup of fibrous material; of a handle therefor of similar material comprising a loop secured at its ends to the cup, said ends being spaced apart from each other in a direction circumferentially of the cup, the sides of the loop being provided with transverse folding lines and also with a folding line at the apex of the loop.

5. The combination with a cup of fibrous material; of a handle therefor of similar material comprising a loop secured at its ends to the cup, the secured ends being spaced apart in a direction circumferentially of the cup and the loop being collapsible bellows-fashion to a position in which the loop lies flatwise along the cup and expandable into position in which it extends radial to the cup, the portions of the loop approaching the points of securement to the cup diverging toward the cup when the sides of the loop are pinched together in holding the cup.

6. The combination with a cup of fibrous material; of a handle therefor of similar material comprising a loop formed with base flanges overlying the periphery of the cup and extending in opposite directions relative to each other from the inner ends of the loop, the sides of the loop being spaced apart at their inner ends and the loop being provided with transverse folding lines whereby it is collapsible bellows-fashion to lie flatwise on the cup.

7. The combination with a cup of fibrous material; of a handle therefor of similar material comprising a loop formed with base flanges overlying the periphery of the cup, the sides of the loop being provided with transverse folding lines whereby it is collapsible to lie flatwise on the cup and foldable from collapsed position to a position radial with the cup, side portions of the loop being convergent when the loop is in expanded form.

LEON E. LA BOMBARD.